(12) United States Patent
Baccelli

(10) Patent No.: US 8,123,270 B2
(45) Date of Patent: Feb. 28, 2012

(54) MOTOR VEHICLE ROOF

(75) Inventor: Gian Luca Baccelli, Taunusstein-Orlen (DE)

(73) Assignee: GM Global Technology Operations LLC, Detroit, MI (US)

( * ) Notice: Subject to any disclaimer, the term of this patent is extended or adjusted under 35 U.S.C. 154(b) by 0 days.

(21) Appl. No.: 12/145,078

(22) Filed: Jun. 24, 2008

(65) Prior Publication Data

US 2009/0001770 A1 Jan. 1, 2009

(30) Foreign Application Priority Data

Jun. 26, 2007 (DE) .......................... 10 2007 029 580

(51) Int. Cl.
*B60R 9/045* (2006.01)
*B60R 9/05* (2006.01)

(52) U.S. Cl. ....... 296/37.7; 296/217; 224/318; 224/320; 224/321

(58) Field of Classification Search ................. 296/37.1, 296/37.7, 26.04–26.07, 165, 217, 219, 172, 296/176; 224/318, 320, 321; 454/129, 136
See application file for complete search history.

(56) References Cited

U.S. PATENT DOCUMENTS

| | | | | |
|---|---|---|---|---|
| 3,053,562 A * | 9/1962 | Farber | .......................... | 296/26.05 |
| 3,619,001 A * | 11/1971 | Borskey | .......................... | 296/176 |
| 3,897,100 A * | 7/1975 | Gardner | .......................... | 296/10 |
| 5,156,568 A * | 10/1992 | Ricci | .............................. | 454/129 |
| 5,615,818 A * | 4/1997 | Linden | .......................... | 224/326 |
| 6,457,771 B2 * | 10/2002 | Farber | ...................... | 296/220.01 |
| 7,055,896 B2 | 6/2006 | Ozkok et al. | | |
| 2004/0189058 A1* | 9/2004 | Eiermann | ................ | 296/220.01 |
| 2005/0116510 A1 | 6/2005 | Leroy et al. | | |
| 2008/0224492 A1* | 9/2008 | Adams et al. | ................ | 296/37.1 |

FOREIGN PATENT DOCUMENTS

| | | |
|---|---|---|
| DE | 6605515 U | 5/1970 |
| DE | 3603452 A1 | 8/1987 |
| DE | 4344604 C1 | 12/1994 |
| DE | 29911895 U1 | 12/1999 |
| DE | 19831133 A1 | 1/2000 |
| DE | 10340746 A1 | 3/2005 |
| DE | 10341558 A1 | 3/2005 |
| DE | 102009030364 A1 | 12/2010 |
| FR | 2796606 A1 | 1/2001 |

* cited by examiner

*Primary Examiner* — Dennis Pedder
(74) *Attorney, Agent, or Firm* — Ingrassia Fisher & Lorenz, P.C.

(57) ABSTRACT

A motor vehicle roof is provided that included, but is not limited to a base roof and a roof segment essentially vertically adjustable relative to the base roof. The roof segment is designed, essentially, to fit closely with the base roof in a closed state and to provide a space in relation to base roof in an open state. The roof segment can include, but is not limited to at least one upper, relatively adjustable, roof element connected with the roof segment, and/or the base roof can include, but is not limited to at least one lower, relatively adjustable roof element connected with the base roof. Through the adjustable roof element the storage space can be open and closed. As a result, the transportation of objects is improved without significantly compromising safety.

11 Claims, 4 Drawing Sheets

Motor Vehicle Roof

CROSS-REFERENCE TO RELATED APPLICATION

This application claims priority to German Patent Application No. 102007029580.6, filed Jun. 26, 2007, which is incorporated herein by reference in its entirety.

TECHNICAL FIELD

The invention generally relates to a roof for motor vehicles, and particularly relates to a roof for large-capacity passenger vehicles (e.g., a van, station wagon or mini-bus) that can be part of the motor vehicle body.

BACKGROUND

From DE 198 31 133 A1 a motor vehicle roof is known from. The roof comprises a base roof with a roof lining. Within the base roof, a roof segment is provided that extends across the entire base roof and can be swung out of the base roof. When closed, the roof segment aligns itself with the surface of the base roof. When it is opened, the roof segment arranges itself essentially parallel to the starting position, in order to form a small gap between the roof segment and the base roof. This configuration allows for an equalization of pressure in the interior of the motor vehicle in the event of one or more airbags being released.

The disadvantage of this type of motor vehicle roof is that the movable roof-segment involves a safety-critical building component which must not be hindered in its function. Particularly with large-capacity passenger vehicles such as vans, station wagons, or mini-buses, this presents a disadvantage in that this sort of automobile is often used in order to transport objects (e.g., sport luggage or bulky objects). For the functionality of a large-capacity passenger vehicle, in particular, it is therefore particularly desirable that it be possible to transport objects on the roof. The ability to transport objects on the roof is, however, clearly impaired by a roof segment which is extendable in the case of an emergency; no objects can be transported in the vicinity of this roof segment for reasons of safety.

In view of the foregoing, at least one object is to create a motor vehicle roof which improves the transportation of objects without significantly compromising safety. In addition, other objects, desirable features, and characteristics will become apparent from the subsequent summary, detailed description, and the appended claims, taken in conjunction with the accompanying drawings and this background.

SUMMARY

A motor vehicle roof is provided in accordance with an exemplary embodiment. The motor vehicle roof includes, but is not limited to, a base roof and a roof segment essentially vertically adjustable relative to the base roof, which essentially fits tightly against the base roof and, in an open state, is spaced away from the base roof. In the opened state, an additional storage space is created to accommodate pieces of luggage and the roof segment includes, but is not limited to at least one upper roof element that is adjustable relative to the roof segment, and/or the base roof includes, but is not limited to at least one lower roof element that is adjustable relative to the base roof.

The motor vehicle roof in accordance with an exemplary embodiment is particularly suitable for a large-capacity passenger vehicle (e.g., a van, station wagon, a transporter up to about 7.5 tons, or a mini-bus). The motor vehicle roof comprises a base roof through which, in particular, a roof lining for the motor vehicle can be developed. Furthermore, a roof segment is provided, which is essentially vertically adjustable relative to the basic roof. When closed, the roof segment aligns itself with the surface of the base roof. When it is opened, the roof segment arranges itself essentially parallel to the starting position. According to an exemplary embodiment, an additional storage space is created for storage, such as storage of luggage. The additional storage space shows that there is additional accessible capacity between the base roof and the roof segment in comparison to when it is closed. This space is preferably sheltered by the roof segment. The storage space is, in particular, dimensioned so that, for example, a suitcase could be stored just in the additional storage space alone. According to an exemplary embodiment, the roof segment comprises an upper roof element which is connected to and adjustable relative to the roof segment. In addition or alternatively, the base roof comprises at least one lower roof element which is connected to and adjustable relative to the base roof. The top roof element and/or the bottom roof element feature lamellae in accordance with an exemplary embodiment.

Through the adjustable roof element, the accessibility to the additional storage space which is formed, if required, between the roof lining and the extended roof segment is made simple. As a result, the motor vehicle roof can also be used particularly for compact cars, sports-cars or super-sports cars, for which generally no storage space has been provided. Because when the motor vehicle roof is closed it barely accelerates the aerodynamic drag, the maximum speed is hardly affected for vehicles developed for high speeds; additional storage space can be created, where necessary, if the maximum speed is not of higher importance than the available transport volume. In case an upper adjustable roof element is provided, it will be possible to load baggage or other bulky items from the side of the roof. In the case of a lower adjustable roof element, the storage space can be separated from the passenger interior after loading. The design of the roof lining is not compromised as a result. In addition, the lower roof element can be used as a place to deposit objects which have been put in the storage space. With the help of the lower roof element, the passenger interior can not only be enlarged as needed, but it is also possible to create additional space to store objects for transportation. Preferably, the lower roof element aligns itself with the side of the roof lining of the base roof, pointing towards the motor vehicle interior. Through the lamellae provided for the upper and/or lower roof elements, the roof element can be transferred in a particularly compact condition, so that very little storage space is needed for the compacted roof element. Because the roof segment can create such a large gap between itself and the base roof, enabling space for more baggage, it is not necessary to fasten pieces of baggage on the surface of the roof segment outside of the motor vehicle roof in order to improve the transportation of baggage. At the same time, at least one adjustable roof element can be configured to open, so that, in the event of the airbags being activated, an equalization of pressure is possible across the roof element, thus ensuring that safety is not compromised. The adjustment of the entire roof segment is not required in order to make an equalization of pressure possible. In particular, in the case of long and/or bulky objects, it is possible to clamp these between the roof segment and the base roof, so that additional security for the cargo is ensured.

Preferably, the roof element, meaning the lower and/or upper roof element, is hinged on at least one pivot axle. The pivot axle can hereby run laterally to and/or within the roof element. For example, the upper roof element is rectangularly developed and can be opened on the pivot axle running along the length of the roof element. Further, it is possible to arrange the roof element to be pivotable within a frame with the frame can be hinged on another pivot axle. This makes it possible to pivot, for example, a rectangular roof element on the side wall as well as on the face and/or on two opposing sides. Furthermore, it is possible to provide more roof elements which are swivel mounted on at least one pivot axle. For example, a roof element can be developed in two parts with both parts of the roof segment can be hinged on a common pivot axle. As a result it is possible to form two lids and one lid can be opened from the right side and the other lid from the left side and can be opened towards the middle of the motor vehicle.

It is particularly preferred that a roof element comprises lamellae which can be arranged one beneath the other and/or one above the other and/or can be interspersed. The roof element can be transformed in this way from a long, flat state into a compact state. In a long, flat state, the lamellae of the roof element can close the storage space. In a compacted state, the storage space is opened, wherein the roof element is not in the way during the loading of baggage into the storage space. Depending on the case of application, the lamellae can, in particular, perform a rotation (for example, at about 90°±10°), so that the lamellae whose fronts point towards each other in a closed state point above and below in an opened state. The discs are arranged one behind the other in this case and the sides with the biggest surfaces in a compact, open state also point towards each other.

In a particularly preferred embodiment, the motor vehicle roof comprises a spoiler, which is connected with the base roof in an adjustable or non-adjustable way. In this case, the lamellae of the roof element can be arranged in a compacted state underneath the spoilers, so that, in essence, the lamellae can be arranged in a compacted state in the area between the spoiler and the base roof. The compacted lamellae are, in this case, arranged in a space within the storage space which is usually not needed for loading and unloading the storage space.

In a preferred embodiment, the upper roof element and/or the lower roof element are, at least partially, developed transparently. In particular, it is preferred for one roof element to be, in essence, transparent and the other to be opaque. That is, either the upper roof element is at least partially transparent and the lower roof element is opaque, or the lower roof element is at least partially transparent and the upper roof element is opaque. Because of the transparency of at least one of the roof elements, a window is formed in the roof element in order to improve the brightness in the motor vehicle interior when additional storage space is not needed. In particular, when one roof element is transparent and the other is opaque, each opaque roof element can be additionally used as protection from the sun. For example, the upper roof element can be transparent in order to let sunlight into the motor vehicle interior. If required, the lower roof element can be brought into a closed state, thus providing protection from the sun; alternatively, it can be brought into an opened state in order to let the sunlight into the motor vehicle interior. Particularly when, in this case, the lower roof element shows many lamellae, the sun-protection function is particularly easy to put into effect.

Preferably the motor vehicle roof comprises at least one operating device to move the roof element. The operating device is especially developed as a hoisting device to enable an essentially vertical movement, particularly without making an offset possible or simply with an insubstantial offset in a horizontal direction. The at least one operating device is particularly connected with a left longitudinal structural member and/or with a right longitudinal structural member of the motor vehicle body. Since the longitudinal structural members, as structural building components of the motor vehicle body, handle greater forces in comparison with other motor vehicle components, the operating device can brace itself on the longitudinal structural members in order to operate the roof segment without any problems. Accordingly, the at least one operating device can also be connected with a front and/or rear transverse structural member. The transverse structural member particularly, directly or indirectly, is connected with the longitudinal structural members and, for example, runs between the longitudinal structural members.

It is particularly preferred that an operating device comprises at least one lever which is hinged on to the base roof or the roof segment. The lever is developed so that it is shiftable on the side opposite to the hinge. Particularly, the lever is developed in a slidable way on and/or in the longitudinal structural member or transverse structural member for this purpose. Preferably, the longitudinal structural member or the transverse structural member is at least partially developed as a hollow section, so that within the longitudinal structural member or transverse structural member an implementation for the lever is automatically formed which can, for example, be shifted, with the help of a propelled threaded rod, in a horizontal direction in order to open or close the roof segment.

The provision of two operating devices is particularly preferred. For example, one operating device may be connected to the left longitudinal structural member and the other operating device to the right longitudinal structural member. Particularly preferred are at least two operating devices connected with exactly one activation device, wherein the activation device can be operated pneumatically, hydraulically or electromagnetically, by an actuator or a linear motor. Additionally or alternatively, the activation of the activation device can happen manually with the help of a crank handle, for example. In order to develop the connections between the activation device and the operation device relatively quickly and cost-effectively, the activation device is preferably connected to a laterally aligned transverse structural member, which runs between the left longitudinal structural member and the right longitudinal structural member. In particular, the activation device is arranged concentrically so that the same means of connection can be used for the activation device and each operating device. It is also possible to switch the longitudinal structural members and the transverse structural member so that the operating devices are connected to the transverse structural member and the activation device is connected with the longitudinal structural member.

Preferably, at least one locking device is provided in order to be able to lock the roof element and/or the roof segment, particularly in different positions. For this purpose, a stopping mechanism can be provided, or a brake, which can lock the roof element and/or the roof segment smoothly. It is particularly preferred that the locking device can be activated by remote control. As a result, it is, for example, possible to lock or unlock the roof element and/or the roof segment and/or at least one lamella through the remote control signal of a motor vehicle key. Additionally, or alternatively, the roof element and/or the roof segment can, for example, be activated electronically from the motor vehicle interior. For this purpose, a corresponding switch is provided on the driving panel.

In a preferred embodiment, the roof segment is flexibly bound with a spoiler. The spoiler is, in particular, bound flexibly and/or in a horizontally shiftable way with the base roof. If the roof segment is moved out of the level of the base roof, the spoiler is moved along with it, so that the roof segment, in an opened, lowered state, does not substantially accelerate the aerodynamic drag of the motor vehicle. In order to equalize, if necessary, a changing clearance between the spoiler and roof segment, a length adjustment can be provided between the roof segment and the spoiler. The length adjustment is achieved, for example, by a flexible, particularly elastic material that can simultaneously repel rain water. In order to guarantee a kinematic connection between the spoiler and the roof segment, the spoiler and the roof segment can be connected by a lengthwise shiftable slide control.

Preferably, the roof segment extends from the left longitudinal structural member to right longitudinal structural member, where the storage space may, if needed, be enlarged over the entire width of the motor vehicle roof.

In order to protect the storage space from environmental influences, a flexible protective cover can be connected with the roof segment and with the base roof. The protective cover can, for example, be developed in such a way that, when the roof segment is in a retracted state, it is folded up, and when the roof segment is in an extended state, it forms end walls for the storage space. Furthermore, the protective cover can comprise opening devices in order to open the protective cover within a sub-area. For example, the protective cover comprises a zipper in order to open the portion of the protective cover which goes against the direction of travel, so that especially long objects, such as surf boards, can be transported without additional problems.

It is particularly preferred that the roof segment comprises, in a maximally opened state, a vertical clearance to the base roof of about $\leqq 10$ cm, in particular about $\leqq 30$ cm, preferably about $\leqq 50$ cm, particularly preferably about $\leqq 80$ cm. Through this dimensioning of the clearance between the roof segment and the base roof, the clearance is measured from the surface of the roof segment to the surface of the base roof, a volume for the storage space that is large enough to store objects, particularly pieces of luggage or bulky objects, is achieved.

In order that objects can also be bound to the motor vehicle roof next to the adjustable roof segment without the adjustable roof segment being able to bump into the already fastened objects, it is preferred to keep a horizontally directed offset of the roof segment as minimal as possible. For this purpose, the roof segment can, in its maximally opened state, and in comparison with its closed state, comprise a horizontally directed offset of about—10 cm, particularly $\leqq$about 5 cm, preferably $\leqq$about 2 cm, and particularly preferably $\leqq$about 1 cm and further preferably $\leqq$about 0.5 cm. Through this dimensioning of the offset, the function of the motor vehicle roof as a transport mechanism for more objects is not further compromised; simultaneously, many alternative activation devices for the adjustment of the roof segment can be chosen depending on each case of application.

An exemplary embodiment further applies to a motor vehicle body which is particularly provided for vans, station wagons, or mini-buses and comprises a motor vehicle roof, which can be developed and improved as described above. Preferably, a left longitudinal structural member and a right longitudinal structural member are provided, so that the motor vehicle roof can be safely connected with the motor vehicle body as one single module. The motor vehicle roof can, in particular, be locked to the longitudinal structural members, so that the longitudinal structural members can bound the base roof. Particularly, a right railing and a left railing are provided in order to aid the fastening of luggage pieces and bulky objects to the motor vehicle roof. Preferably, the roof segment, in its maximally opened state, comprises a gap between itself and the surface of the base roof which is bigger than the about 1.5-fold, in particular the about 2-fold, preferably the about 3.5-fold, and particularly preferably, the about 5-fold of the clearance between the surface of the roof railing and the surface of the base roof. As a result of this dimensioning of the clearance between the roof segment and the base roof, an additional fastening device can be formed with the aid of the roof segment, through which an object which is to be transported can be fastened to the motor vehicle roof and, in particular, can be tied to it. For example, the object which is bound to the roof railing can be protected from the air stream during driving by the extended roof segment. It is particularly preferred that the surface of the roof segment is located at essentially the same level as the surface of the roof railing, so that the aerodynamic drag against the direction of travel is not substantially accelerated and, at the same time, that a depression in the roof lining and/or the base roof for the inclusion of the roof segment is not necessary.

BRIEF DESCRIPTION OF THE DRAWINGS

The present invention will hereinafter be described in conjunction with the following drawing figures, wherein like numerals denote like elements.

DETAILED DESCRIPTION

The following detailed description is merely exemplary in nature and is not intended to limit application and uses. Furthermore, there is no intention to be bound by any theory presented in the preceding background, summary, the following detailed description.

Figure 1:
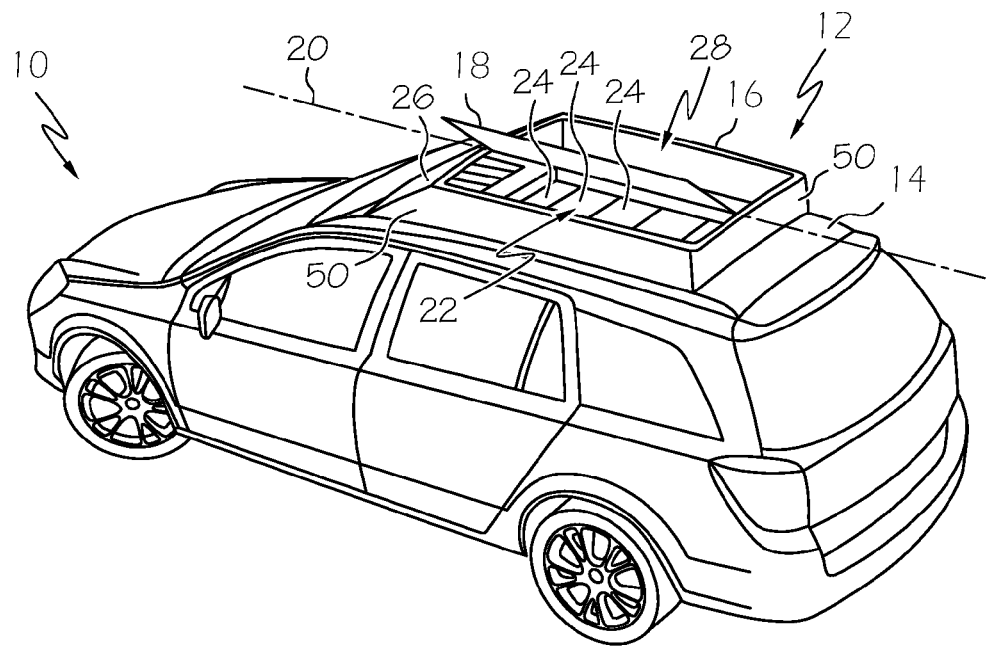
FIG. 1 shows a schematic perspective view of a motor vehicle with the motor vehicle roof in accordance with the invention in a first exemplary embodiment.

A motor vehicle 10, such as the one presented in FIG. 1, comprises a motor vehicle roof 12, which comprises a base roof 14 and a roof segment 16, which is essentially adjustable in a vertical direction. In the presented embodiment example, the roof segment 16 comprises an upper roof element 18, which is hinged on the face around a pivot axle 20, which is arranged laterally to the direction of travel. Alternatively, the upper roof element can comprise numerous parts which can be compacted in the same way as lamellae 24: on top of each other, underneath each other or interspersed with each other, for example.

The lower roof element 22 is particularly arranged so that it is flush with the roof lining of the motor vehicle 10. Alternatively to the embodiment shown in FIG. 1, the lower roof element 22 can be developed in a comparable way to a window shade. Further, the roof element 22 can be engineered as a hard shell and/or a reticule.

Figure 2:
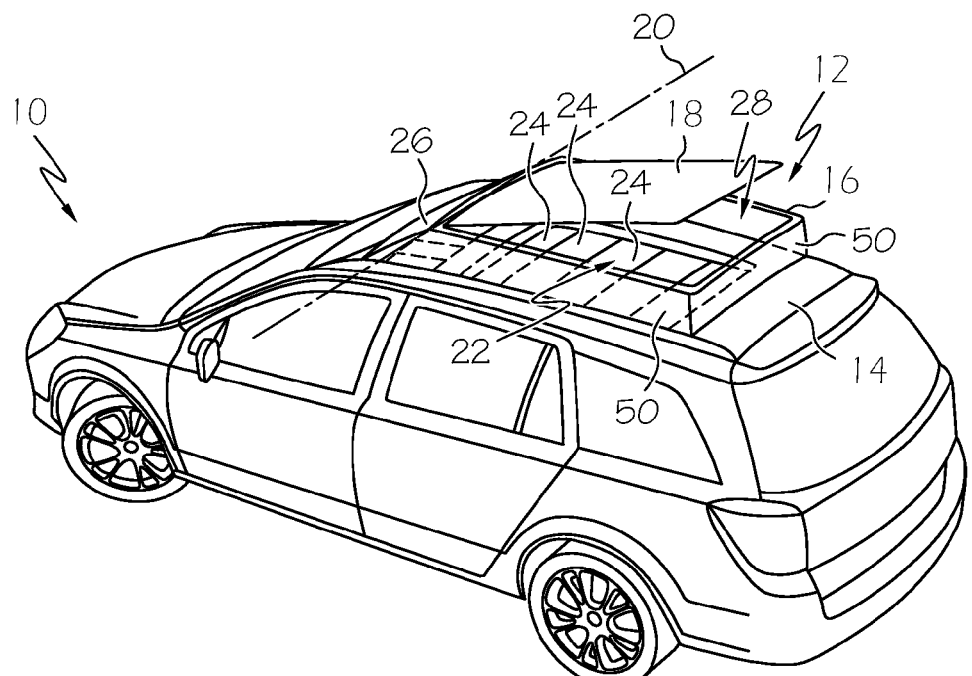
FIG. 2 shows a schematic perspective view of a motor vehicle with the motor vehicle roof in accordance with the invention in a second exemplary embodiment.
Figure 2A:
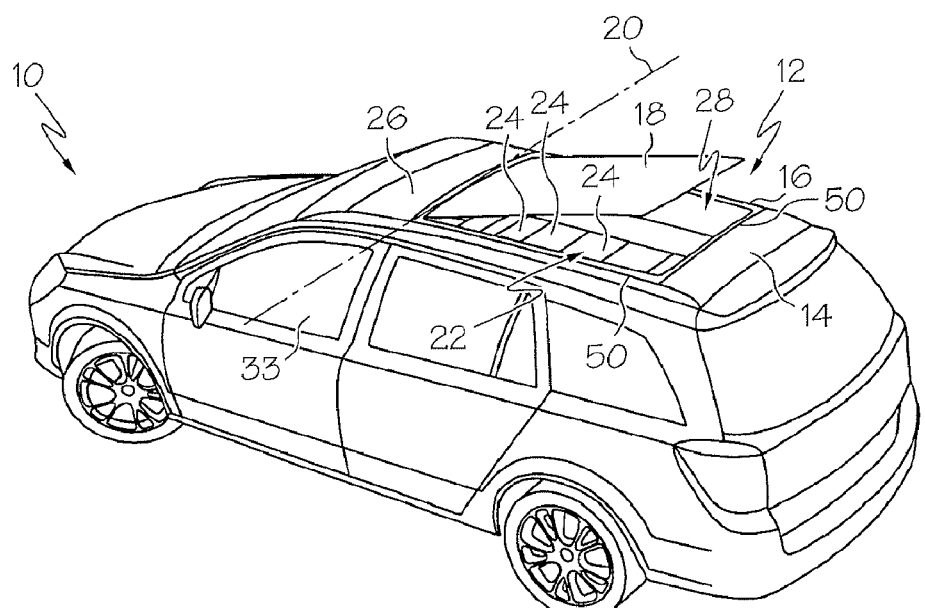
FIG. 2A shows a schematic perspective view of the motor vehicle of FIG. 2 with the motor vehicle roof in a retracted position in accordance with the invention in a second exemplary embodiment.

In the motor vehicle 10 illustrated in FIG. 2, the pivot axle 20 of the upper roof element 18 is arranged laterally to the direction of travel. Furthermore, the essentially rectangular upper roof element 18 is adjoined at its face to the spoiler 26 with the roof element 16 in a rotatable way. Preferably, the upper roof element 18, in an opened state through which the upper roof element can be moved with the help of hoist cylinders, for example, is arranged in such a way that the surface of the upper roof element 18 is essentially flush with the surface of the Spoiler 26. This causes the upper roof element to function comparable to a sliding roof when the roof segment is in a closed state (See, FIG. 2A). When the roof element 16 is in an extended state, that is, opened state, the beam width of the spoiler 26 is enlarged, so that the upper roof element 18 is arranged in a particularly enlarged position, which achieves a particularly simple loading of the storage space formed between the roof segment 18 and the base roof 14.

The gap between the roof segment 16 and the base roof 14 is in an opened, that is, an extended state, and is dimensioned in such a way that a storage space 28 is developed with a volume large enough to encompass luggage and/or bulky objects. The storage space 28 comprises, in particular, a volume of at least 100 liters, preferably 200 liters and particularly preferably 300 Liters. In particular, it is possible in the presented implementation examples to use the transport volume of the motor vehicle interior 33 as well as the transport volume of the storage space 28 for the transportation of objects because the object in the motor vehicle interior 33 can reach into the storage space 28 when the lower roof element 22 is open.

Figure 3:
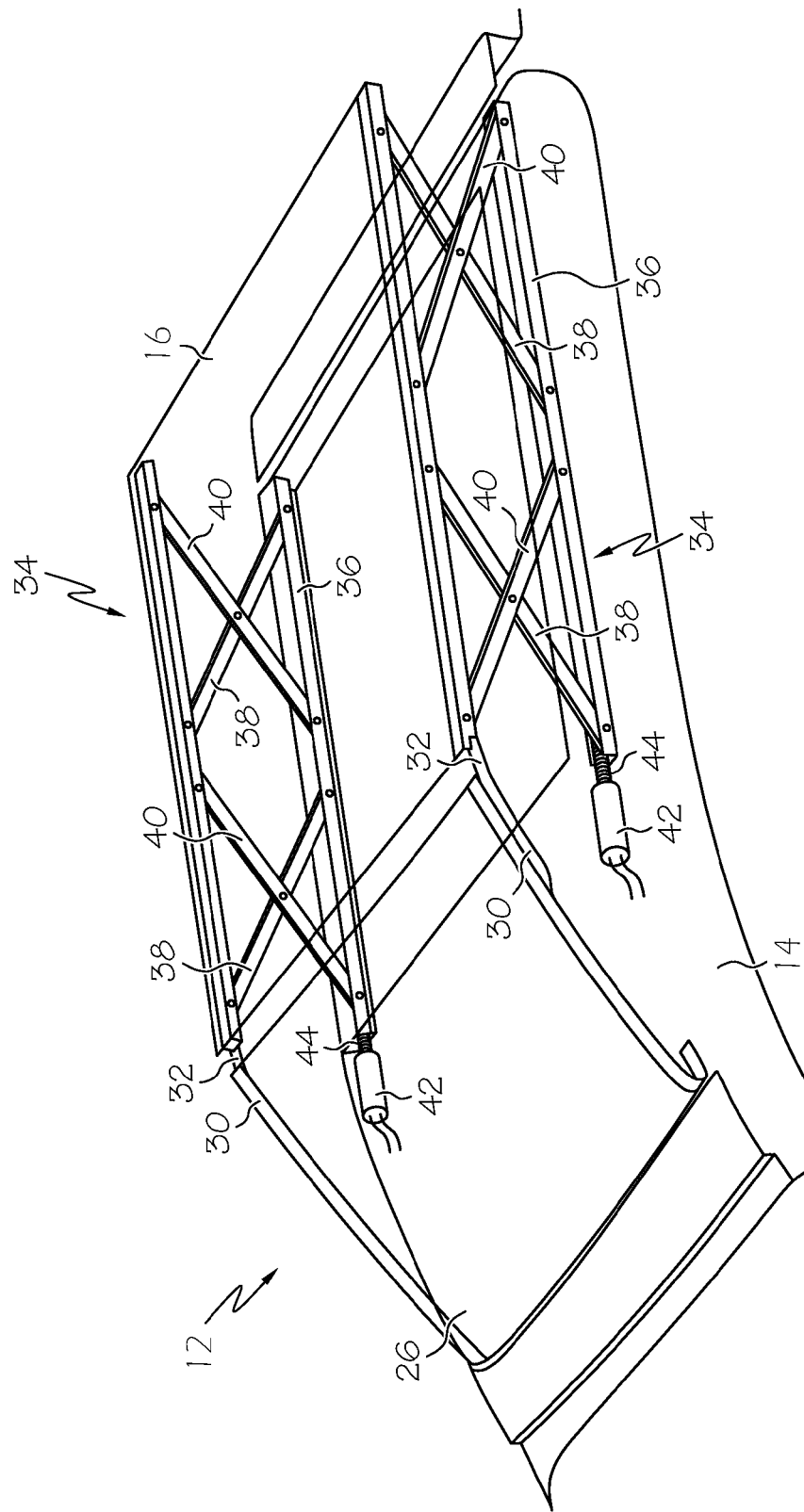
FIG. 3 shows a schematic perspective view of a motor vehicle roof with a first operating device.

The spoiler 26 can be connected with a roof segment 16 through a conduction 30 led sliding lever 32 (FIG. 3). In the illustrated embodiment, the roof segment 16 is moved with the help of two operating devices 34 essentially without an offset in a vertical direction. The operating devices 34 are each connected with a longitudinal structural member 36 which runs lengthwise along the motor vehicle, in order to brace themselves on the longitudinal structural members 36 when the roof segment 16 is moved. Each operating device 34 comprises at least one pair of levers which comprises one first lever 38 and one second lever 40, which are flexibly connected at a cross. The levers 38, 40 are further flexibly connected with the roof segment 16. Further, an electrically operated operating device 42 is provided, which moves the lower ends of the levers 38, 40 through an arbor 44 in order to move the roof segment 16 upwards as well as the other way around.

Figure 4:
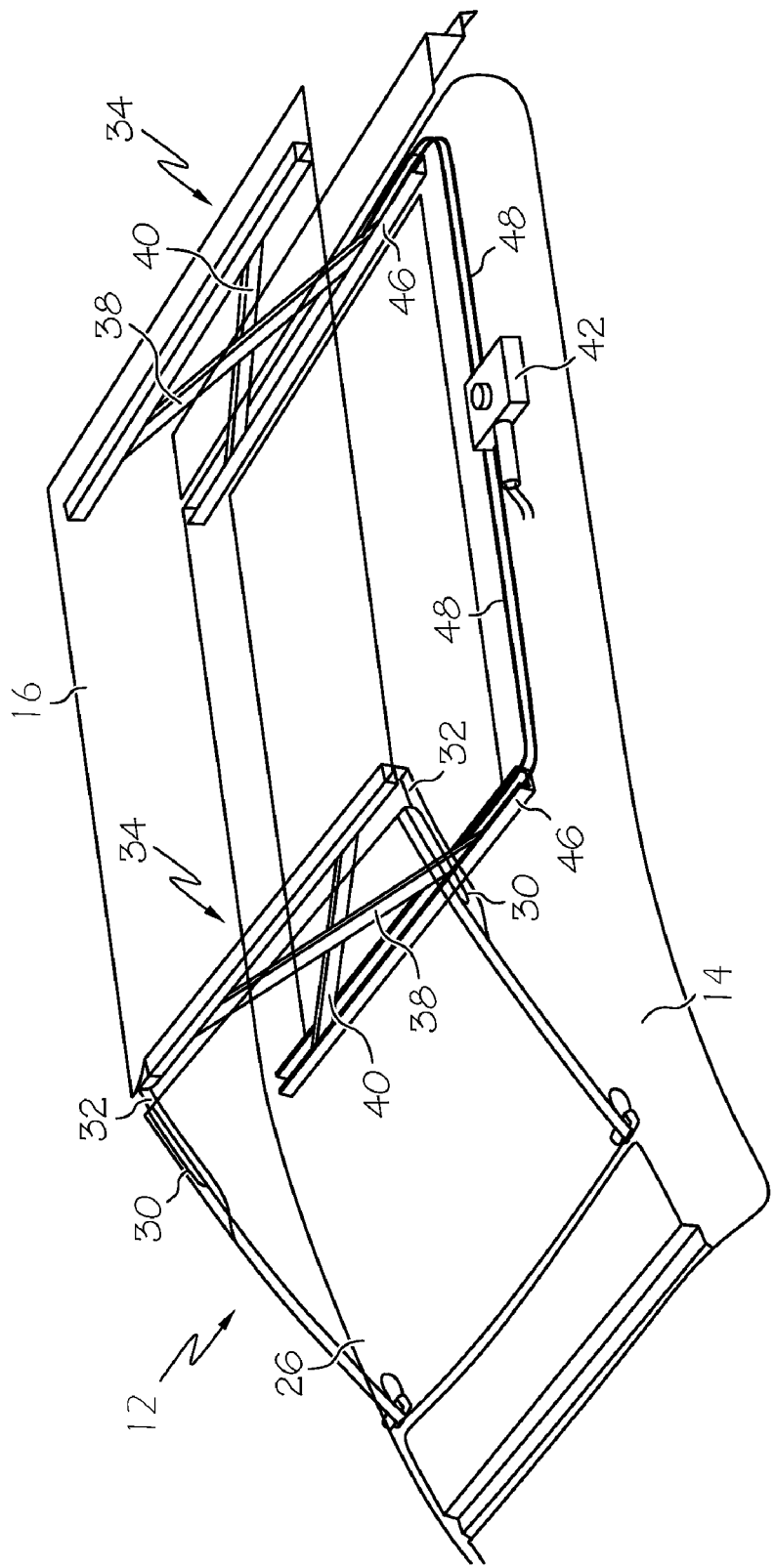
FIG. 4 shows a schematic perspective view of a motor vehicle roof in accordance with the exemplary embodiments of the invention with a second operating device.

The operating devices 34 can, however, also be arranged laterally to the direction of travel (see FIG. 4) and be braced on the lateral bows 46 between the longitudinal structural members 36, in which the levers 38, 40 are implemented. Furthermore, is possible to provide precisely one activation device 42 for both operating devices 34. In the embodiment example illustrated in FIG. 4, the activation device 42 comprises pathways 48 in order to power the operating devices by pushing the lower ends of the levers 38, 40 towards each other or away from each other.

Figure 1A:
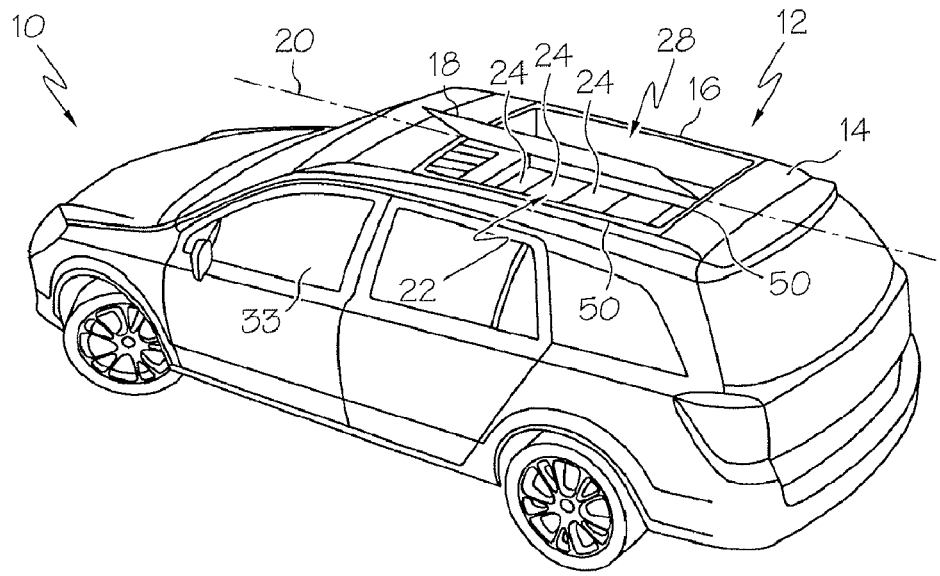
FIG. 1A shows a schematic perspective view of the motor vehicle of FIG. 1 with the motor vehicle roof in a retracted position in accordance with the invention in a first exemplary embodiment.

Between the roof segment 16 and the base roof 14, a protective cover 50 can be provided in order to protect the storage space 28 from environmental influences (FIG. 1, FIG. 2). The protective cover 50 is particularly designed in such a way that when the roof segment 16 is retracted (FIG. 1A, FIG. 2A), the protective cover 50 automatically folds together.

While at least one exemplary embodiment has been presented in the foregoing summary and detailed description, it should be appreciated that a vast number of variations exist. It should also be appreciated that the exemplary embodiment or exemplary embodiments are only examples, and are not intended to limit the scope, applicability, or configuration in any way. Rather, the foregoing summary and detailed description will provide those skilled in the art with a convenient road map for implementing an exemplary embodiment, it being understood that various changes may be made in the function and arrangement of elements described in an exemplary embodiment without departing from the scope as set forth in the appended claims and their legal equivalents.

What is claimed is:

1. A motor vehicle roof, comprising:
   a base roof;
   a roof segment with a forward edge configured to sit on top of the base roof and fit tightly against the base roof in a closed state, the roof segment further adapted to vertically adjust relative to the base roof and spaced away from the base roof in an open state;
   a spoiler with an upper edge, the spoiler adjustably connected at the upper edge with the forward edge of the roof segment via a sliding lever; and
   a protective cover folded between the base roof and the roof segment in the closed state and unfolded between the base roof and the roof segment in the open state.

2. The motor vehicle roof according to claim 1, further comprising at least one upper roof element that is adjustable relative to the roof segment and the base roof, wherein the at least one upper roof element is pivotable around at least one pivot axle that is particularly arranged along the inside of the upper roof element and is substantially parallel to the base roof.

3. The motor vehicle roof according to claim 1, further comprising lamellae that are adjustable relative to the roof base and constitute one or more lower roof elements.

4. The motor vehicle roof according to claim 2, wherein the at least one upper roof element is transparent.

5. The motor vehicle roof according to claim 1, further comprising an operating device configured to move the roof segment, wherein the operating device is configured for connection to at least one of a left longitudinal structural member and a right longitudinal structural member.

6. The motor vehicle roof according to claim 5, wherein the operating device comprises a lever mounted on a hinge on the base roof.

7. The motor vehicle roof according to claim 1, wherein the roof segment in a maximally opened state provides a vertical space of greater than about 10.0 cm.

8. The motor vehicle roof according to claim 1, further comprising a left longitudinal structural member and a right longitudinal structural member connected to the base roof.

9. The motor vehicle roof according to claim 8, wherein the roof segment extends from the left longitudinal structural member to the right longitudinal structural member.

10. The motor vehicle roof according claim 1, further comprising at least two operating devices that are connected with an activation device for activating the operating device, wherein the activation device is connected particularly with at least one of a transverse structural member and a longitudinal structural member.

11. A motor vehicle roof comprising:
    a base roof comprising at least one lower roof element being adjustable relative to the base roof;

a roof segment with a forward edge, the roof segment being vertically adjustable relative to the to the base roof, the roof segment being configured while in a closed state to align itself with the surface of the base roof; being configured while in an open state to be spaced away from the base roof thereby forming an additional storage space that is sufficient to accommodate a piece of luggage, and comprising at least one upper roof element that is adjustable relative to the roof segment, wherein, one of the upper roof element and the lower roof element is at least partially transparent and the other is opaque, and a spoiler with an upper edge, the spoiler adjustably connected at the upper edge with the forward edge of the roof segment via a sliding lever.

\* \* \* \* \*